S. BERENS.
HEADLIGHT LAMP FOR AUTOMOBILES.
APPLICATION FILED JULY 6, 1914.

1,135,566.

Patented Apr. 13, 1915.

WITNESSES.
H. P. Palmer
A. S. Phillips

INVENTOR.
Stanislaus Berens,
BY Chas. C. Tillman
ATTY.

UNITED STATES PATENT OFFICE.

STANISLAUS BERENS, OF CHICAGO, ILLINOIS.

HEADLIGHT-LAMP FOR AUTOMOBILES.

1,135,566. Specification of Letters Patent. Patented Apr. 13, 1915.

Application filed July 6, 1914. Serial No. 849,091.

*To all whom it may concern:*

Be it known that I, STANISLAUS BERENS, a citizen of the United States, residing at the city of Chicago, in the county of Cook and State of Illinois, have invented certain new and useful Improvements in Headlight-Lamps for Automobiles, of which the following is a specification.

This invention relates to improvements in lamps, and has particular relation to headlight-lamps of motor vehicles and especially automobiles, and it consists in certain peculiarities of the construction, novel arrangement and operation of the various parts thereof as will be hereinafter more fully set forth and specifically claimed.

As is well known, many States and cities have passed and strictly enforce laws and ordinances prohibiting the use of glaring and brilliant head-lights (unless dimmed) on vehicles while traveling on the streets of cities and towns, on account of the blinding effect on pedestrians, who are frequently blinded and dazzled by said brilliant lights, and consequently are unable to see the approaching vehicle, to avoid and prevent being injured thereby. These brilliant lights are very desirable for use in country driving, as they clearly disclose, in darkness, to the chauffeur or driver of the vehicle, the ruts, obstacles and imperfections of the road to be avoided, and can be legally used on country roads.

It is, therefore, the principal object of the invention to provide a lamp which is especially intended to be used as a headlight-lamp for automobiles, but which is available for use as such lights on motor cycles, and other vehicles, if desired, as rear or side lights, and which shall be simple and inexpensive in construction, strong, durable and efficient in operation.

A further object of the invention is to provide a lamp by which a light of the highest degree of brilliancy may be produced or provided, either by electricity or gas, and so diffused or refracted as to disclose the character of the road or ground surface, without impairing the vision of pedestrians or others.

Still another object of the invention is to furnish means for adjusting the brilliancy of the light as conditions may require.

Other objects and advantages of the invention will be disclosed in the subjoined description and explanation.

Figure 1:
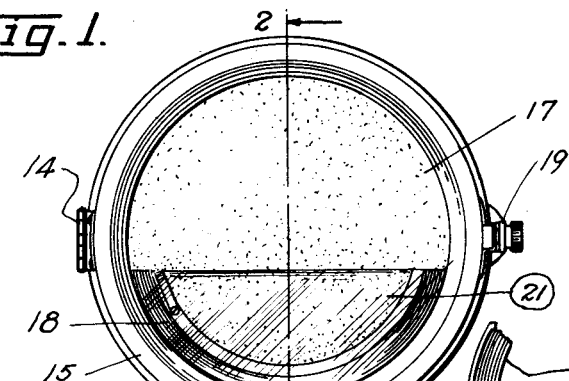
Figure 4:
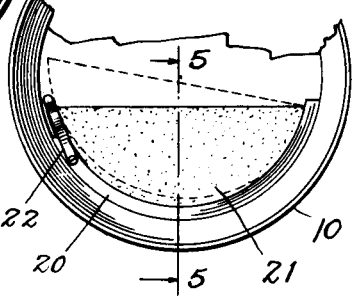
Figure 2:
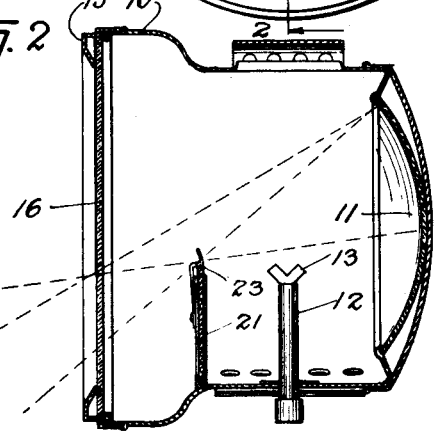
Figure 5:
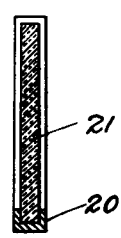
Figure 3:
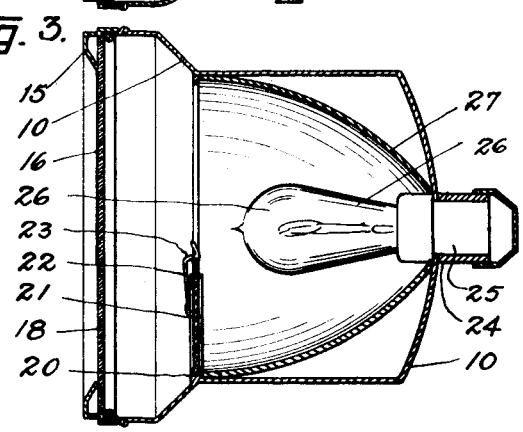

In the accompanying drawing, which serves to illustrate the invention—Figure 1 is a front view of a lamp, embodying the invention; Fig. 2 is a central vertical sectional view thereof taken on line 2—2 of Fig. 1, looking in the direction indicated by the arrows; Fig. 3 is a similar view, showing a modification in the construction of the lamp; Fig. 4 is a fragmental front view of the body of the lamp with the front cover or plate removed and illustrating the means of securing the inner translucent plate in position within the lamp body, and Fig. 5 is a sectional view taken on line 5—5 of the inner translucent plate and its holder.

Like numerals of reference refer to corresponding parts throughout the different views of the drawing.

The reference numeral 10 designates the body of the lamp, which may be made of any suitable size, form and material, but preferably of sheet metal, and cylindrical in shape, with its front portion somewhat circumferentially enlarged, as shown in Figs. 2 to 4 inclusive of the drawing. Fitted in the rear portion of the body 10 or lamp casing is a reflector 11 of the ordinary or any preferred construction, which reflector may be held in position by any suitable means. Extended upwardly through the lower portion of the body or casing 10 is a tube 12, which may have communication with a supply of gas (not shown) and said tube is equipped at its upper end with a burner 13 of any desired construction or kind. At its front end the casing or body 10 has secured thereto, and usually by means of a hinge 14 a cover carrying ring 15, which has fitted therein a plate of glass or other suitable transparent or semi-transparent material 16, which constitutes the front plate or covering of the lamp. This front plate is by preference made of glass and has its upper portion rendered translucent by being ground or otherwise suitably prepared. The translucent portion of the plate 16 is indicated by the reference numeral 17, and as shown in Fig. 1 is segmental in shape, with its lower edge disposed at a slight distance below a horizontal line drawn through the center of said plate. Below the lower edge of the translucent portion 17 the plate 16 is left transparent as is indicated by the reference numeral 18, which transparent portion is also segmental in form as shown.

The ring 15 which holds the front plate or cover 16 may be fastened to the casing 10 by means of a catch 19 of any suitable construction, which is by preference located diametrically opposite the hinge 14 which secures the ring to the casing. It will be understood, however, that the ring 15 may be attached to the front end of the casing 10 in any suitable or desired way. Inwardly of the front end of the casing, and by preference at the contracted portion of the enlargement of said casing is located a channeled holder 20 for the inner translucent plate 21, which is segmental in shape, as is clearly shown in Fig. 4 of the drawing, and is of sufficient size so that when placed in the holder 20 therefor its upper edge will be located about on a line with the lower edge of the translucent portion 17 of the front plate. At one of its ends the holder 20 is closed, as shown in Fig. 5, but has its other end open so that the plate 21 may be readily removed from the channel of said holder, as will be understood by reference to Fig. 4 of the drawing, in which figure the plate 21 is shown by dotted lines in the act of being removed from its holder. Near the open end of the holder 20 a spring fastener 22 is secured at one of its ends, which fastener has at its upper end a shoulder 23 to rest on the upper edge of the plate 21 so as to hold the same in position in the holder 20 until it is desired to remove said plate, which can be done by pressing the spring 22 outwardly until the shoulder 23 thereof is removed from the plate 21, when it is apparent said plate may be lifted from the holder, thus allowing the light to be reflected through the transparent portion 18 of the front plate without hindrance or without being diffused, which is desirable on country roads. After the plate 21 has been removed, it is evident that the translucent portion 17 of the front plate will so diffuse the light as to prevent glaring or binding effect on pedestrians.

In Fig. 3 is shown a modification in the construction of the lamp, in which the construction is identical with that above described, except that the rear portion of the lamp casing is provided with a socket 24, in which is fitted a plug 25 of an electric light bulb or lamp 26, which may have connection in the usual manner with a supply of electricity (not shown). When the electric lamp is employed, a reflector 27, extending from the contracted portion of the casing 10 to the rear end of the casing, and surrounding the bulb 26, is employed. When the translucent plate 21 is in position within the casing, it is obvious that the brilliant or undiffused light will be reflected downwardly and forwardly on about the lines indicated by broken lines in Fig. 2 of the drawing, and that the translucent portion 17 of the front plate and the translucent plate 21 will diffuse the light thrown in a straight line forwardly, so that the vision of pedestrians will not be impaired.

Having thus fully described my invention what I claim as new and desire to secure by Letters Patent is—

1. In a headlight-lamp, the combination with a casing having at its rear inner portion a reflector, of a light producer within the casing, a cover transversely mounted on the front of the casing and having an upper translucent portion and a lower transparent portion, and a translucent plate located transversely of the casing inwardly of the transparent portion of the cover and in front of said light producer.

2. In a headlight-lamp, the combination with a casing having at its rear inner portion a reflector, of a light producer within the casing, a cover plate transversely and removably mounted on the front of the casing and having its upper portion translucent and its lower portion transparent, and a translucent plate removably located transversely of the casing inwardly of the transparent portion of the cover plate.

STANISLAUS BERENS.

Witnesses:
  Chas. C. Tillman,
  A. S. Phillips.